United States Patent [19]
Bruecker

[11] 3,961,693
[45] June 8, 1976

[54] INVERTED SILO CHUTES HAVING SWINGABLE SIDE WALL PANELS

[76] Inventor: George B. Bruecker, Rte. 1, Greenleaf, Wis. 54126

[22] Filed: Apr. 9, 1975

[21] Appl. No.: 566,593

[52] U.S. Cl.................................. 193/14; 52/195; 193/29; 193/34
[51] Int. Cl.².......................................... B65G 11/02
[58] Field of Search ........... 193/4, 29, 33, 34, 25 R, 193/5, 14, 23; 214/17 R, 17 DB; 52/195, 196

[56] References Cited
UNITED STATES PATENTS

| 1,877,234 | 9/1932 | Gallagher | 193/34 |
|---|---|---|---|
| 2,182,728 | 12/1939 | Lutz | 52/195 X |
| 3,063,581 | 11/1962 | Bruecker | 214/17 DB |

Primary Examiner—Evon C. Blunk
Assistant Examiner—James L. Rowland
Attorney, Agent, or Firm—Arthur L. Morsell, Jr.

[57] ABSTRACT

An inverted discharge chute, positioned in the interior of a silo opposite the unloading openings thereof, comprises an upright series of oppositely-disposed side wall panels each hinged to a side of the unloading opening of the silo and normally projecting inwardly thereof. An upright series of retainer panels removably connects the opposed side wall panels to form the inner end of the inverted chute, the side wall panels being swingable outwardly to cover the adjacent opening portion when the retainer panel is removed.

7 Claims, 5 Drawing Figures

U.S. Patent   June 8, 1976   3,961,693
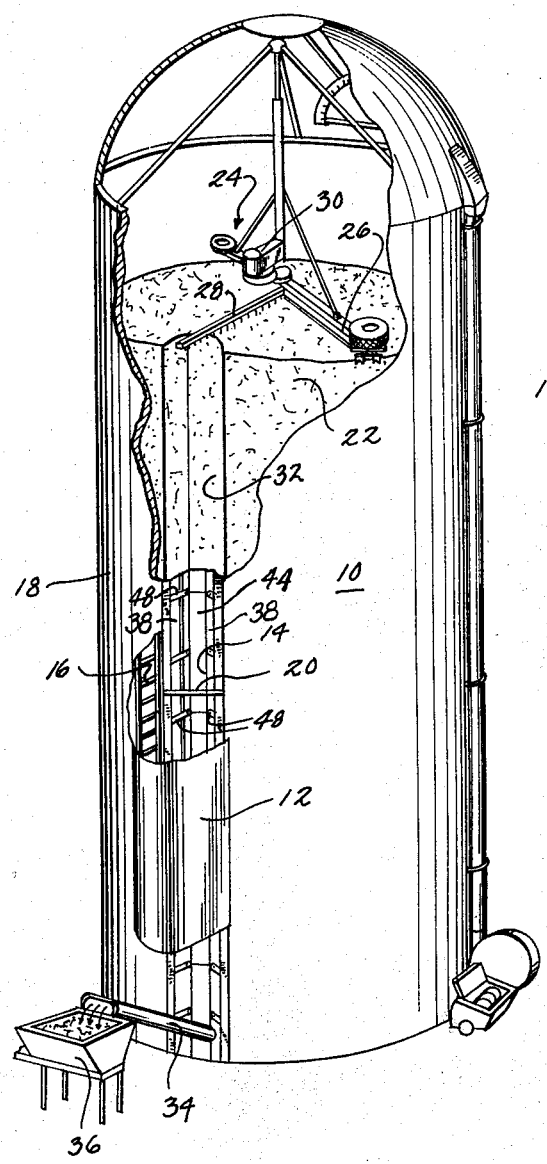

INVERTED SILO CHUTES HAVING SWINGABLE SIDE WALL PANELS

BACKGROUND OF THE INVENTION

Inverted discharge chutes have been previously employed in silos as disclosed in my U.S. Pat. Nos. 3,063,581; 3,063,497; and 3,071,263. As shown in FIGS. 2 and 3 of U.S. Pat. No. 3,063,581, the inverted chute can be formed by an upright series of bowed members which project inwardly of the silo opposite the discharge openings thereof. Various methods of attaching the bowed members to the silo are disclosed in U.S. Pat. No. 3,063,497.

Normally the silage is removed from the silo by automatic unloading apparatus such as disclosed in FIGS. 2 and 3 of U.S. Pat. No. 3,063,581. This appratus includes a power driven rotary collector which breaks up the top layer of silage and conveys it to the center of the silo, where it is picked up by a lateral conveyor and is carried to the top of the inverted discharge chute formed by the bowed members. The conveyed silage drops down the inverted chute and is removed from the silo through the lowermost portion of the discharge opening.

As the silage is unloaded, the level of the silage lowers, and as the automatic unloading apparatus also lowers, this necessitates removal of the uppermost bowed elements to permit the lateral conveyor to carry the silage to the top of the discharge chute. As the silage level lowers further, the next lower bowed element must be removed, and so on down until the silo is empty. To remove the bowed elements, the farmer must climb up a ladder in an exterior chute, loosen and remove the desired bowed element, and then carry it down the chute to the bottom of the silo.

Due to the fact that the bowed element immediately below the unloading apparatus is always removed in the prior patent, some of the silage which has been conveyed to the top of the inverted discharge chute spills out the exposed portion of the discharge opening and falls down the exterior chute instead of remaining within the inverted discharge chute. Silage thus spilled forms a pile at the bottom of the exterior chute, which must be eventually removed. Another drawback of the devices of the prior art is that the chute and door sections are relatively large and heavy and are difficult to remove and carry down the exterior chute.

SUMMARY OF THE INVENTION

In accordance with this invention, the above-noted difficulties are eliminated by providing an upright series of side wall panels which may be permanently hinged to the side margins of the discharge openings of a silo to replace the bowed elements that were previously employed. When the side wall panels are in a normal position, projecting inwardly toward the interior of the silo, they form the side surfaces of an inverted discharge chute. The inner portion of the inverted discharge chute is formed by an upright series of spreaders which form retainer panels and which are adapted to be removably latched to the edges of the side wall panels to maintain them in chute-forming position. When the spreaders are removed, the side wall panels are released so that they can be swung outwardly toward the discharge opening to close the adjacent portion thereof and provide clearance for the unloading apparatus. In this position, the side wall panels block the discharge opening and prevent spillage of silage. The spreaders are relatively light and small and are easy to remove and carry down the exterior chute.

An object of the invention is, therefore, to accomplish the above purpose with a simple and inexpensive construction which will fit silos having openings of various widths.

DESCRIPTION OF THE DRAWINGS

FIG. 1 is a perspective view of a silo equipped with one embodiment of the invention, outer portions of the silo being cut away to reveal inner details.

FIG. 2 is an enlarged fragmentary side elevational view looking into the silo opening and showing several side wall panels and retainer panels latched together to form an inverted discharge chute within the silo of FIG. 1.

FIG. 3 is a cross-sectional view taken on the line 3—3 of FIG. 2.

FIG. 4 is a fragmentary cross-sectional view similar to FIG. 3, with the retainer panel removed and the side wall panels swung outwardly to close the discharge opening.

FIG. 5 is an enlarged fragmentary cross-sectional view taken on the line 5—5 of FIG. 2 showing a portion of the latch means for removably latching the retainer panels to the side wall panels.

DESCRIPTION OF THE PREFERRED EMBODIMENT

Referring to FIG. 1, this invention is used in combination with a silo 10 having a vertical exterior chute 12 that covers a vertical series of discharge openings 14. A ladder 16 is mounted within chute 12. The side margins of vertically-aligned discharge openings 14 form a vertical slot in the concrete wall 18 of silo 10. The upper and lower margins of discharge openings 14 in the illustrated embodiment of the invention are defined by horizontal steel rods 20 (FIG. 3) whose ends are embedded at vertically-spaced locations in silo wall 18 and provide the necessary bracing to keep the side margins of discharge openings 14 from spreading apart due to the pressure of silage 22 within silo 10. Other equivalent horizontal elements may be used in place of the rods 20.

Unloading apparatus 24, which is of the general type shown in my U.S. Pat. No. 3,063,581, is positioned on top of silage 22 and includes a rotary collector 26, a lateral collector 28, and suitable motor driven means 30 for actuating collectors 26 and 28. Rotary collector 26 rotates around the interior of silo 10, breaks loose the top layer of silage 22, and carries it to the center of silo 10, where it is picked up by lateral collector 28, which carries the silage outwardly to the top of an inverted chute 32 that extends downwardly to the bottom of silo 10. The conveyed silage falls down inverted chute 32 and is picked up at the bottom of chute 32 by a conveyor 34 which carries it to a feed trough 36.

Inverted chute 32 is formed in a novel way by an upright series of side wall panels 38 (FIGS. 2, 3 and 4) which are hinged at their outer side edges to wooden studs 42 which are attached to silo wall 18 at the side margins of discharge openings 14. In the illustrated embodiment, the hinges include metal staples 40 in the studs which are loosely engaged in holes in the sides of the panels. Side wall panels 38 normally extend inwardly of silo wall 18 and form the side walls of inverted chute 32.

The end surface of inverted chute 32 is formed by an upright series of spreaders 44, which are termed retainer panels in the claims, and which are removably attached between the inner side edges 46 of the side wall panels by swingable latch arms 48 which are pivotally connected at their inner ends 50 to bent portions 51 of the retainers 44 and which engage within latch fingers 52 on the side wall panels 38. In this embodiment of the invention, two pairs of latch arms 48 are used for each end wall panel 44. Latch arms 48 are made of angle iron, each having a downwardly-extending portion 53 and an outwardly-extending flange 54 (FIG. 5) by which latch arms 48 can be easily grasped for swinging into or out of latching position.

Before silo 10 is filled, all of the retainer panels 44 are latched to side wall panels 38 in the relationship shown in FIG. 3. After silo 10 has been filled with silage 22, inverted chute 32 will remain in the silage even after the retainer panels 44 have been removed and after the side wall panels 38 have been swung outwardly to the position shown in FIG. 4. As silage 22 is unloaded, the level of the silage lowers and unloading apparatus 24 also lowers. After the unloading apparatus 24 has lowered a predetermined distance, it is necessary to remove the next lower retainer panel 44 and to swing the adjacent side wall panels 38 outwardly to the position shown in FIG. 4. To do this, the farmer climbs ladder 16 to the desired level, swings the latch arms 48 of the required end wall panels 44 upwardly to release them, then removes retainer panel 44, swings side wall panels 38 outwardly to close the opening, as in FIG. 4, and then carries retainer panel 44 down ladder 16 and subsequently stores it in a suitable location. Since the retainer panels are relatively light and small, they are easy to handle.

In their closed position (FIG. 4), side wall panels 38 close the adjacent discharge opening portion 14 and prevent the silage from spilling out after it is fed into the top of inverted chute 32 by unloading apparatus 24.

Various changes and modifications may be made without departing from the spirit of the invention, and all of such changes are contemplated as may come within the scope of the claims.

What I claim is:

1. In a silo having a wall and having an upright opening in said wall, an inverted chute projecting inwardly in said silo in registration with said upright opening, the improvement wherein said chute includes at least one upright series of swingable panels each having inner and outer edges, each panel being hingedly connected along its outer edge to a side of said upright opening for independent swinging movement from a position projecting inwardly of the silo to form part of the chute to a position where it serves as a continuation of the silo wall to close part of said opening, and readily removable connecting means releasably holding said swingable panels in said position where they project inwardly of the silo, said panels being swingable to non-projecting position with respect to the interior of the silo and being sized and positioned to each close part of said opening when swung toward said opening on the hinge connections after said removable connecting means has been released.

2. The improvement defined in claim 1 wherein said chute comprises upright series of oppositely disposed swingable panels, one series on each side, and wherein the means releasably holding said panels in inwardly projecting position removably connects the swingable panels on one side with the swingable panels on the other side to releasably maintain said panels in said position where they project inwardly of the silo to aid in forming the chute, and wherein said swingable panels are sized and positioned so that a pair of oppositely disposed panels cooperate to close a part of said opening when swung toward each other and toward said opening on the hinge connections after the removable connecting means has been released.

3. The improvement defined in claim 2 wherein said removable connecting means comprises an upright series of retainer panels forming a back wall of the chute, and wherein there is readily detachable latch means removably connecting each retainer panel to a pair of said swingable panels.

4. The improvement defined in claim 3 wherein said latch means comprises a plurality of latch arms pivotally attached to each retainer panel, and latch fingers on each swingable panel positioned to receive a corresponding latch arm.

5. The improvement defined in claim 4 wherein each of said latch arms is formed of angle iron and includes a flange projecting outwardly from a swingable panel providing a finger grip.

6. The improvement defined in claim 2 wherein each retainer panel has outwardly-bent side edges in overlapping relationship with the inner side edges of the swingable panels.

7. The improvement defined in claim 6 wherein the latch means comprises latch arms pivoted to said outwardly-bent portions of the retainer panels and complementary latching elements on the swingable panels.

* * * * *